United States Patent
Zuberi et al.

(10) Patent No.: US 8,036,227 B2
(45) Date of Patent: *Oct. 11, 2011

(54) QUALITY OF SERVICE SUPPORT FOR A/V STREAMS

(75) Inventors: Khawar M. Zuberi, Bellevue, WA (US); Mathias Jourdain, Seattle, WA (US); Rajesh Sundaram, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/724,106

(22) Filed: Mar. 15, 2010

(65) Prior Publication Data
US 2010/0172358 A1    Jul. 8, 2010

Related U.S. Application Data

(63) Continuation of application No. 11/410,349, filed on Apr. 25, 2006, now Pat. No. 7,693,157.

(51) Int. Cl.
*H04L 12/28*    (2006.01)
(52) U.S. Cl. .................................. 370/395.41
(58) Field of Classification Search ............... 370/395.41
See application file for complete search history.

(56) References Cited

U.S. PATENT DOCUMENTS

| | | | |
|---|---|---|---|
| 6,950,875 B1 * | 9/2005 | Slaughter et al. | ............. 709/230 |
| 7,031,654 B2 | 4/2006 | Yamaguchi | |
| 7,369,859 B2 | 5/2008 | Gallagher | |
| 7,385,960 B2 | 6/2008 | Bansal et al. | |
| 7,675,856 B2 | 3/2010 | Padmanabhan | |
| 7,693,157 B2 * | 4/2010 | Zuberi et al. | ............. 370/395.41 |
| 2001/0044275 A1 * | 11/2001 | Yamaguchi | .................. 455/11.1 |
| 2005/0083841 A1 * | 4/2005 | Zuberi | ......................... 370/230 |

OTHER PUBLICATIONS

Quality Windows Audio-Video Experience—gWave, WinHEC 2004 Version, Apr. 13, 2004, to Microsoft Corporation.*
Microsoft Corporation, "Quality Windows Audio-Video Experience—qWave," Windows Hardware and Driver Central, WinHEC 2004 Version—Apr. 13, 2004.
Lakshminarayanan, et al., "Bandwidth Estimation in Broadband Access Networks," IMC' 04, Oct. 25-27, 2004, pp. 314-321.

* cited by examiner

*Primary Examiner* — Ayaz Sheikh
*Assistant Examiner* — Hai-Chang Hsiung

(57) ABSTRACT

An access control mechanism in a network connecting one or more sink devices to a server providing audio/visual data (A/V) in streams. As a sink device requests access, the server measures available bandwidth to the sink device. If the measurement of available bandwidth is completed before the sink device requests a stream of audio/visual data, the measured available bandwidth is used to set transmission parameters of the data stream in accordance with a Quality of Service (QoS) policy. If the measurement is not completed when the data stream is requested, the data stream is nonetheless transmitted. In this scenario, the data stream may be transmitted using parameters computed using a cached measurement of the available bandwidth to the sink device. If no cached measurement is available, the data stream is transmitted with a low priority until a measurement can be made. Once the measurement is available, the transmission parameters of the data stream are re-set. With this access control mechanism, A/V streams may be provided with low latency but with transmission parameters accurately set in accordance with the QoS policy.

7 Claims, 5 Drawing Sheets

QUALITY OF SERVICE SUPPORT FOR A/V STREAMS

RELATED APPLICATIONS

This is a continuation of U.S. patent application Ser. No. 11/410,349, entitled "QUALITY OF SERVICE SUPPORT FOR A/V STREAMS" and filed on Apr. 25, 2006, the entire contents of which are hereby incorporated by reference.

BACKGROUND

Many networks incorporate Quality of Service (QoS) management. QoS management increases the overall experience for users of devices connected to the network by setting transmission parameters associated with specific communications over the network. The user experience may be improved by providing preferential treatment to network communications carrying data most likely to affect a user's experience.

In a network with limited bandwidth, preferential treatment may involve setting transmission characteristics of messages so that the more of the available network bandwidth is allocated to communications carrying information likely to impact the user's experience. Multiple ways are known to operate a network so that bandwidth is preferentially allocated to certain communications.

For example, transmission characteristics may be set by "tagging" packets with a priority indicator. Network devices may preferentially process packets tagged to indicate a higher priority. Alternatively, priority of some communications may be increased by reducing the priority of others. For example, low priority communications involving multiple packets may be "throttled" to reduce the number or rate at which packets are injected onto the network. Throttling may occur at the source of the data or at any device along a route through the network.

Networks that carry audio-visual (A/V) streams present a particularly challenging environment for QoS support because they involve large amounts of data. Consequently, the A/V data streams are likely to consume all available bandwidth of a network and create problems associated with transmission quality.

In addition, quality problems of A/V streams are likely to be perceptible to a user when the A/V data is presented to the user by a "sink device" that receives the data over the network. An A/V signal is represented as a stream of packets. If some of the packets in the stream are lost or delayed in reaching the sink device, the user may notice a "glitch" or otherwise perceive sound or picture problems as the A/V stream is presented to the user.

Various approaches have been used for managing QoS in networks carrying A/V streams. One approach that has been used is to buffer multiple packets of data in an A/V stream at the sink device before starting to present the A/V stream for the user. As the sink device receives packets in the stream, it stores them in a buffer rather than presenting them to a user. Once enough packets are stored in the buffer, the sink device presents the A/V data from the buffer. The advantage of buffering is that, if a packet in the A/V stream is delayed in reaching the sink device, the user will not notice because the sink device will be displaying information from the buffer while waiting for the delayed packet to arrive. A drawback of buffering is that the user may perceive a delay as the buffer is initially being filled. Delays of five seconds or more may be necessary, but such delays are too long to meet the expectations of users, who are accustomed to seeing nearly instantaneous response from televisions, stereos and other devices that display audio/visual information.

Another approach for QoS management involves prioritization of packets associated with some data streams. Priorities have been assigned so that data streams that would otherwise overload the network are given a low priority. Prioritizing in this fashion provides an indirect method of bandwidth allocation.

In some instances, bandwidth may be allocated to an A/V stream more directly. If the bandwidth allocated for a data stream is less than the bandwidth of the data stream, an A/V server may reduce the total amount of data used to represent that signal in order for the A/V stream to fit within the allocated bandwidth. Various techniques are available to reduce the amount of data used to represent an A/V signal, such as reducing the resolution of the signal. Though a user viewing the A/V signal when it is presented by a sink device may experience a decrease in signal quality, the overall user experience of viewing a lower resolution signal may be better than if the signal contains glitches or if the data stream carrying the signal overloads the network so that other data streams are also not communicated reliably.

When either a direct or indirect bandwidth allocation is used, a server may measure available bandwidth before allocating bandwidth to a stream. Multiple techniques are available for bandwidth measurement, such as a Packet Rate Measurement (PRM) or a Packet Gap Measurement (PGM) or a "probe gap" approach.

Regardless of which approach is used, measuring available bandwidth can create a delay before the sink device receives the stream. To reduce this delay, a source of video information may cache transmission parameters used to allocate bandwidth to a particular sink device.

SUMMARY

Various embodiments described herein improve the process by which a server that provides a stream sets transmission parameters of the stream in accordance with a QoS policy. The approach has low latency and is accurate. Such an approach is useful for networks that transmit streams of A/V data, such as a home network that connects one or more sink devices to a media server. With the approach, a user is unlikely to perceive an unreasonable delay when requesting a data stream or to perceive interference with an existing A/V data stream when a new data stream is transmitted over the network.

Transmission parameters for each data stream may be set based on a measurement of available bandwidth. If the measurement is complete before the data stream is requested, transmission of the data stream may begin with no delay associated with bandwidth measurement. If the measurement is not completed, the data stream nonetheless may be transmitted without delay, but an alternative approach is used to set the transmission parameters.

Alternative approaches for setting transmission parameters may include using a cached measurement of available bandwidth. If a cached measurement is not available, the transmission parameters may be set so that the data stream is transmitted with a low priority to avoid possible interference with other network traffic. Regardless of the approach used to set transmission parameters of a stream, once a current measurement of available bandwidth is complete, the transmission parameters may be set based on the measurement.

To allow a measurement of available bandwidth to be completed before a data stream is requested by a sink device, the bandwidth measurement may be initiated when the sink device associates with the server. In many instances the bandwidth measurement may be completed before a user of the sink device performs an operation that requires transmission of a data stream to the sink device.

The foregoing is a non-limiting summary of various embodiments.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

QoS is managed in a network intended to carry streams of A/V data by obtaining information needed to set transmission characteristics of a data stream when a sink device accesses a server that will provide the data stream. When a data stream is required, the server may begin transmitting it with little delay, but with parameters set to ensure that the data stream does not overload the network or otherwise negatively impact from a user experience.

The server may set transmission parameters for a data stream based on a measurement of available bandwidth on the network link that will carry that stream. The server may initiate the measurement process before a sink device requests a data stream. For example, the server may begin to measure available bandwidth when a sink device first associates with the server.

In many instances, a user of a sink device will consult a program listing, play list or other menu before providing input that causes the sink device to request a data stream. If the measurement of bandwidth starts when a device associates with the server, the server may measure available bandwidth while the user is consulting the menu information. If the measurement is complete before the user makes a selection from the menu, the user may perceive no delay in the start of the data stream.

Even if the user takes an action that requires the sink device to request a data stream before the server has measured available bandwidth, the data stream may start without perceptible delay. The server may set transmission parameters for the data stream in an alternative way so that the data stream may begin without the user experiencing a perceptible delay as the bandwidth measurement is completed. The transmission parameters may be set using cached information or may be set to transmit the data at a low priority so that it does not interfere with data streams already being transmitted on the network.

In some embodiments, the server is programmed to select from one of multiple alternative approaches to set the transmission parameters of a data stream to increase the accuracy with which transmission parameters are set. In this context, "accuracy" indicates that the transmission parameters for data streams communicated over the network achieve a bandwidth allocation that does not unnecessarily limit the bandwidth of a data stream or allocate so much bandwidth to a stream that it interferes with other network communications.

Measurements of available bandwidth preferably cause little load on the network so that, even if the measurement is not completed before the data stream is transmitted, the measurement can be completed in a background mode. As better information on the actual available bandwidth becomes available, the transmission parameters for a data stream may be re-set.

Figure 1A:
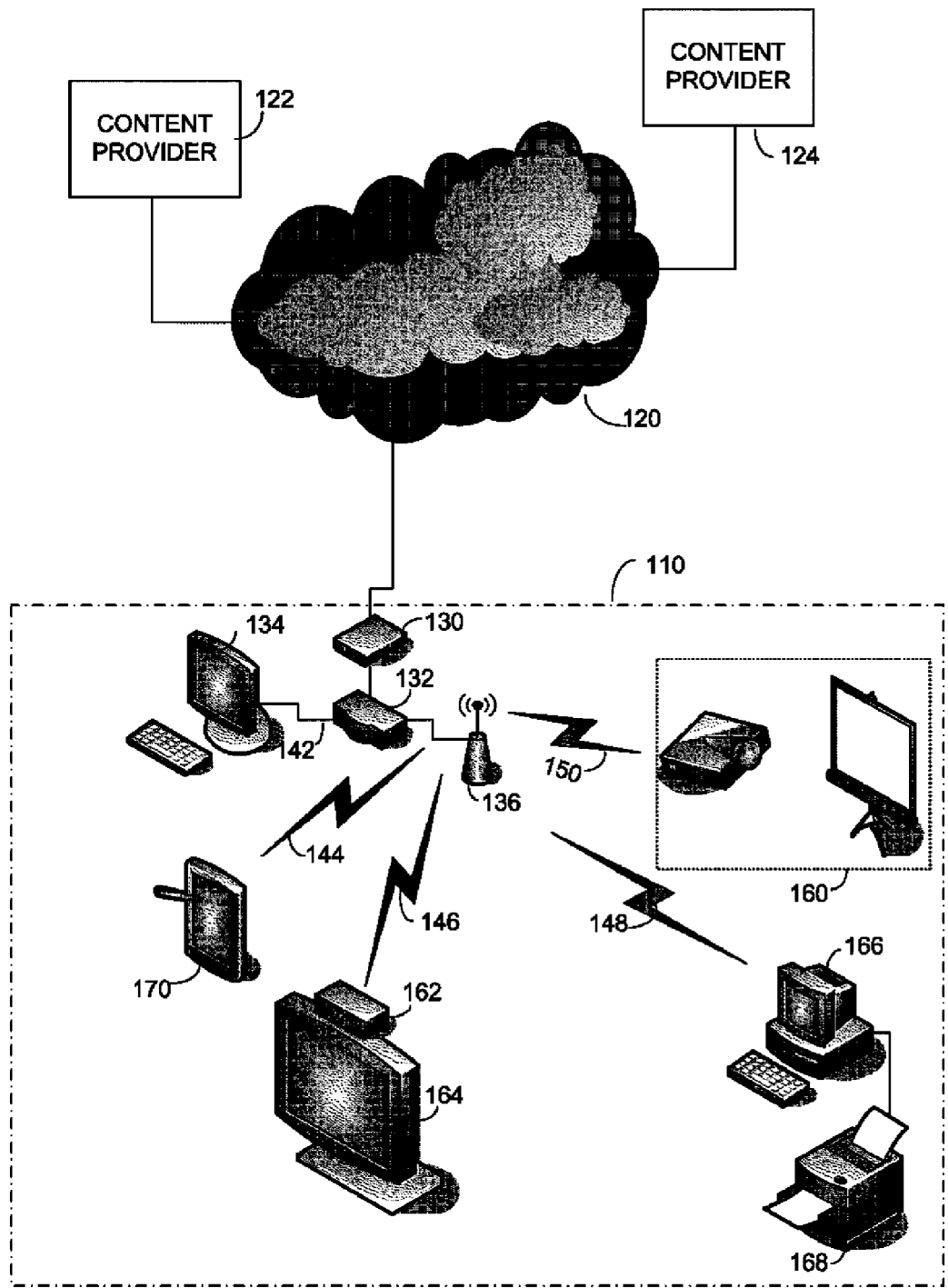
FIG. 1A is sketch of a network according to an embodiment.

FIG. 1A illustrates an environment in which QoS management may be employed. In this example, QoS management is used in a home network 110 containing both devices that transmit and receive streams A/V data and devices that communicate over the network to perform other functions.

For example, desktop PC 166 is connected to home network 110 and printer 168 is connected to desktop PC 166. Network 110 allows other devices, such as tablet PC 170, to send data over the network for printing at printer 168. Tablet PC 170, desktop PC 166 and printer 168 illustrate devices that may transmit data over network 110 for which network delays will not significantly impact user perception of performance. For example, printer 168 may take 10 or 20 seconds to load a sheet of paper and print one page of data transmitted by tablet PC 170. An entire print job may take tens of seconds to minutes, depending on the amount of data to be printed. Accordingly, a user is unlikely to perceive delays in transmission of data from tablet PC 170 to printer 168.

In the embodiments described below, digital data of the form exchanged between tablet PC 170 and desktop PC 166 is conveyed by home network 110 with a low priority, sometimes called "best efforts" priority.

Home network 110 also includes multi-media devices that receive streams of A/V data. In contrast to transmission of digital data between tablet PC 170 and desktop PC 166, a user is likely to perceive delays in transmission of A/V data streams to multi-media devices. For example, FIG. 1A shows a projection television 160 coupled to home network 110. Projection television 160 receives an A/V data stream and uses it to present audio and video information to a user. If some portion of the data stream is delayed in reaching projection television 160, projection television 160 may be unable to present one or more frames of the video signal represented by the A/V data stream at the intended time. Consequently, the user will perceive a glitch in the picture displayed by projection television 160. Similarly, if the A/V data stream represents a song or other audio information, a delay in receiving some portion of the data stream may create a sound "glitch" perceptible to the user.

Projection television 160 is one example of a sink device for an A/V data stream that may be connected to network 110. Other sink devices may be connected to home network 110. For example, FIG. 1A shows a second television 164 with a set top box 162. Set top box 162 may receive an A/V data stream representing a video signal for display on television 164 and/or an audio signal that may be played through speakers associated with television 164. Set top box 162 may perform other functions on the A/V data stream before presenting it to a user. For example, set top box 162 may incorporate a digital video recorder to store the A/V data stream for later display.

Other sink devices, such as game consoles, are currently known and may be included in home network 110. Additionally, new sink devices are currently under development. Accordingly, various embodiments are not limited to use with conventional sink devices such as televisions.

In home network 110, A/V data streams for sink devices are provided from a server also attached to home network 110. In the example of FIG. 1, media server 134 provides A/V data streams. Media server 134 may be constructed using hardware as is conventional in a computer for home use.

Media server 134 may contain software providing the functionality of a conventional media server. In the pictured embodiment, media server 134 is programmed with multimedia applications that receive content over Internet 120 from one or more content providers 122 and 124. Content provider 122, for example, may be a cable operator that provides a wide range of television programming in digital form. Alternatively, a content provider 122 or 124 could provide video content for gaming or may provide music as a digital data stream. The specific type of content and its source is not a limitation on various embodiments.

Media server 134 may be coupled to content providers 122 and 124 in any suitable manner. In this example, home network 110 is coupled to the Internet 120 through modem 130 over a broadband Internet connection. Modem 130 is coupled to router 132, which forms a portion of home network 110. As pictured in FIG. 1A, media server 134 is connected to router 132 through a wired link 142. In this way, media server 134 may receive and process content from content providers 122 and 124.

Network devices may be connected to home network 110 using any desired physical transmission media. In the example of FIG. 1, multiple network devices are shown connected to home network 110 through wireless links. Accordingly, network 110 includes a wireless access point 136 coupled to router 132. Tablet PC 170 is shown to be connected through wireless access point 136 over wireless link 144. Similarly, set top box 162, desktop PC 166 and projection television 160 are shown connected through wireless links 146, 148 and 150, respectively.

Media server 134 and each of the sink devices are programmed so that media server 134 controls the transmission of data streams to the sink device. To provide a better user experience, part of the programming of media server 134 may provide QoS management of A/V data streams, as will be described in more detail below.

Figure 1B:
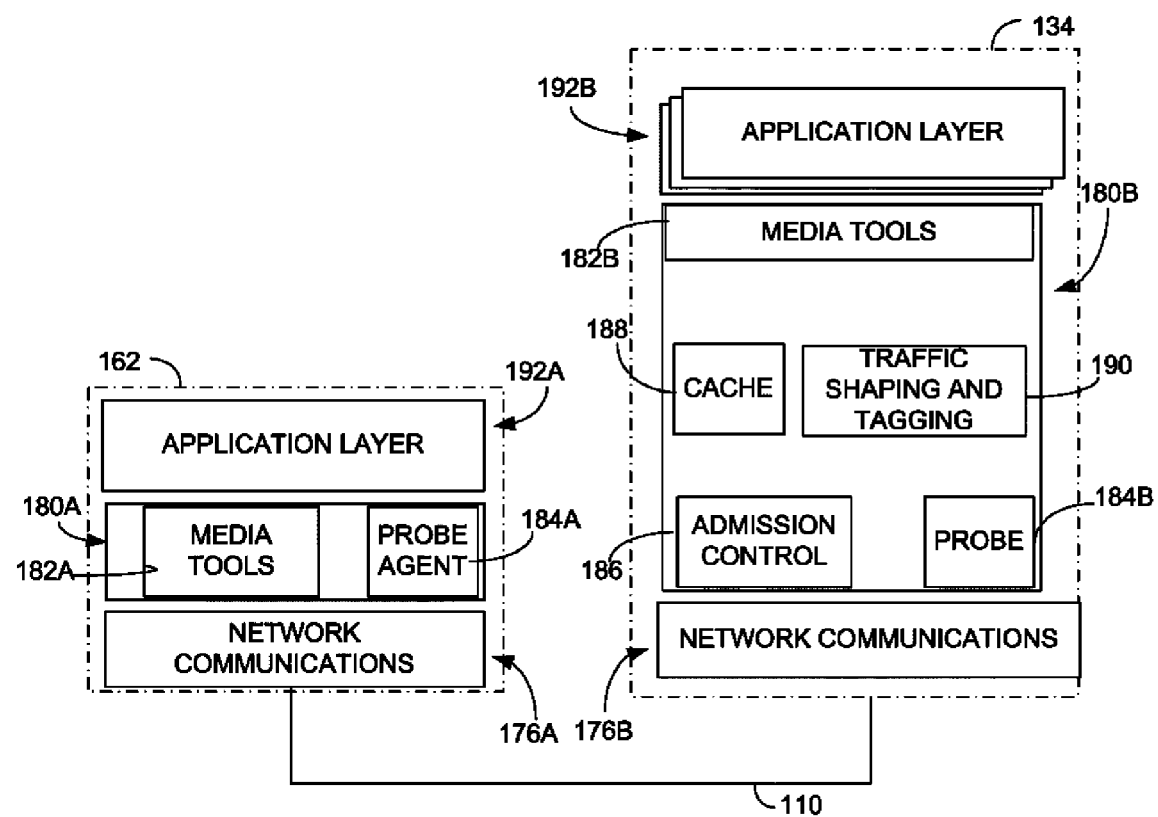
FIG. 1B is a block diagram illustrating a software architecture of devices in the network of FIG. 1A.

FIG. 1B illustrates, in simplified form, an architecture for software that may be incorporated into media server 134 and a sink device. In FIG. 1B, set top box 162 is used as an example of a sink device. Server 134 and set top box 162 are programmed so that A/V data streams may be passed from media server 134 to set top box 162 over network 110.

In the illustrated embodiment, programming within media server 134 and set top box 162 is implemented using a layered model as is conventional in network communications. Here, three layers are illustrated, but segmentation into layers is partially conceptual, and any number of layers may be used. In some embodiments, each layer is implemented as a software module, with one or more sub-modules that perform functions desirable for the layer. In the embodiment of FIG. 1B, set top box 162 includes a network communication layer 176A, media platform layer 180A and application layer 192A. Media server 134 includes corresponding layers, including network communication layer 176B, media platform layer 180B and application layer 192B. Media servers and sink devices using a layered software architecture as pictured in FIG. 1B are known. Conventional programming approaches may be used to construct software within media server 134 and set top box 162, but any suitable methods may be used.

In operation, an application within application layer 192B obtains content information, such as from a content provider 122 or 124. An application within application layer 192B uses media tools 182B within media platform 180B to convert the contents into a digital stream containing multiple packets of data that are ultimately passed through network communication layer 176B where they are transmitted over network 110 as an A/V data stream.

The A/V data stream passes over network 110 to set top box 162. Within set top box 162, similar processing is performed in reverse. Network communication layer 176A passes the packets of the digital stream through media tools 182 within media platform 180A. The digital stream is then passed to application layer 192, where an application processes the packets to present the A/V information to a user in a desired form.

In addition to communicating a data stream from application layer 192B to application layer 192A, the software within media server 134 and set top box 162 may exchange command and control information. For example, software within set top box 162 may communicate information that requests an association with an application on media server 134.

As another example, an application within application layer 192B may communicate a program guide, a play list or other information to application layer 192A. Application layer 192A may present this information to a human user who may select a specific title from the menu information. Application layer 192A may then communicate this information back to application layer 192B, signaling that the user has selected specific content which is then to be transmitted as an A/V data stream to application layer 192A.

Thus, set top box 162 and media server 134 may exchange one or more communications before a data stream is requested or transmitted. These communications may begin an appreciable period of time before the A/V stream is required. One feature of embodiments of a QoS system described herein is that it takes advantage of the time between an initial communication and the need for transmission of an A/V data stream to begin measurement of available bandwidth for the A/V data stream. If the advance bandwidth measurement is completed before the stream is needed, the server may begin to transmit an A/V data stream with transmission parameters set in accordance with a QoS policy without any delay associated with bandwidth measurement.

In the embodiment of FIG. 1B, the QoS policy for data streams is implemented by media platform layers 180A and 180B. The QoS policy is implemented as part of an admission control process performed by media server 134. Admission control is a process that determines the suitability of starting an A/V data stream from a media server to a sink device.

FIG. 1B illustrates admission control module 186 within media platform layer 180. Admission control is a function performed by conventional multi-media software and admission control module 186 may be implemented with conventional programming techniques. However, some portions of admission control module 186 operate according to a novel process, which is described in greater detail in connection with FIGS. 2 and 3 below.

As part of the admission control process, media server 134 determines whether there is sufficient available bandwidth on network 110 to transmit an A/V data stream to the sink device and may allocate bandwidth to the stream according to a QoS policy. For example, if network 110 does not have sufficient available bandwidth for the full A/V data stream, transmission parameters for the data stream may be set during the admission control process to reduce the amount of bandwidth occupied by the data stream.

Admission control module 186 may set transmission parameters for a data stream based on information obtained from one or more sources. Admission control module 186 may use a measurement of available bandwidth on the network link that will carry the data stream to set transmission parameters, which is one possible source of information used to set transmission parameters.

In the embodiment of FIG. 1B, available bandwidth is measured by probe module 184B. Probing to measure available network bandwidth is also an operation performed in conventional multi-media software and probe module 184B may use any suitable method of measuring available bandwidth.

Figure 4:
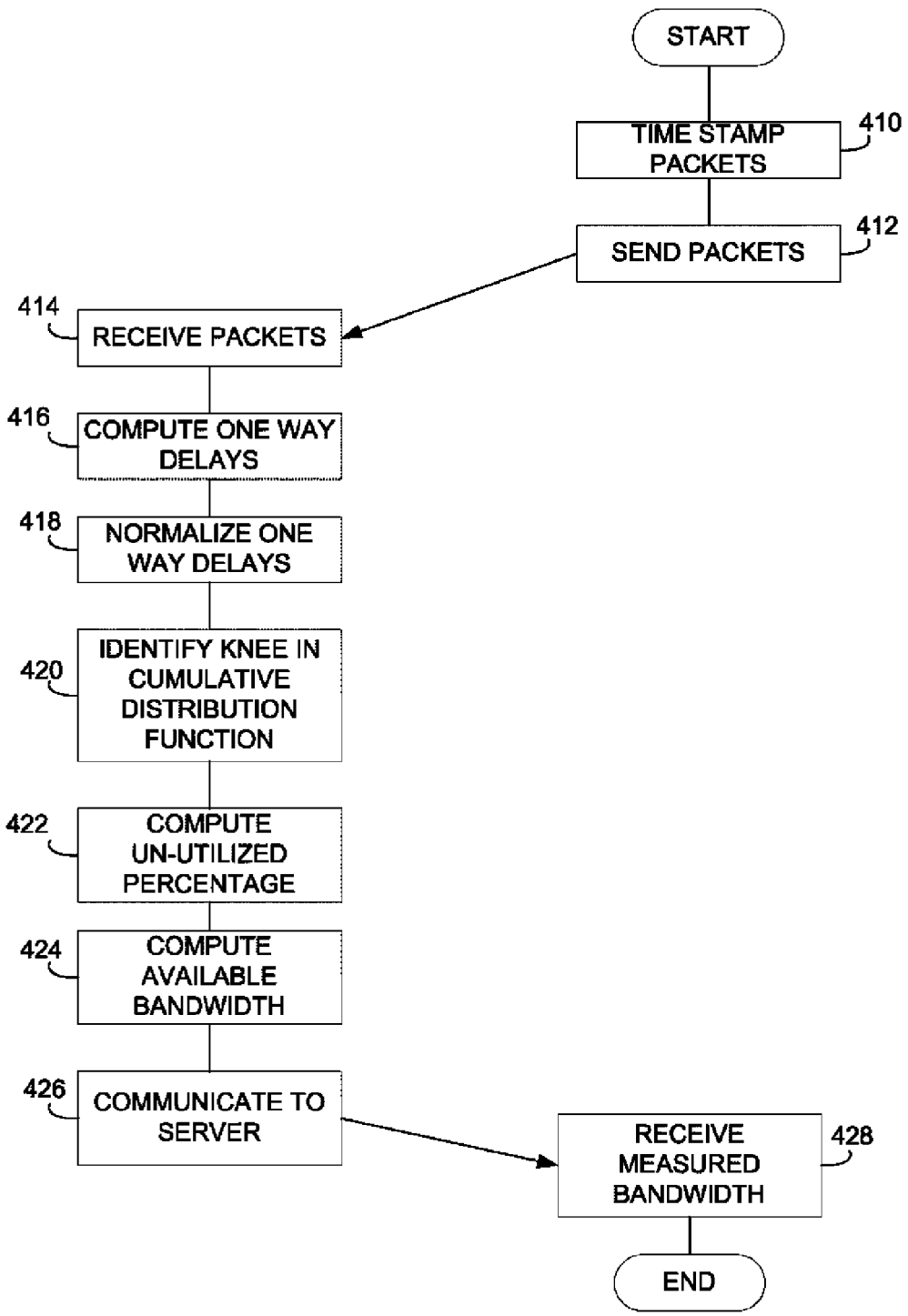
FIG. 4 is a flow chart of a process for probing available bandwidth according to an embodiment.

In the embodiment illustrated, probe module 184B operates in conjunction with a probe agent 184A within media platform layer 180A on a sink device. Probe agent 184A and probe module 184B may be programmed to measure available bandwidth in any suitable way. One suitable implementation of a bandwidth measurement process is shown in FIG. 4.

Admission control module 186 may also obtain information to set transmission parameters for a data stream from cache 188. In the embodiment of FIG. 1B, cache 188 stores information about network links between server 134 and sink devices to which data streams have been previously transmitted. For example, cache 188 may store a previously measured available bandwidth on wireless link 146 between media server 134 and set top box 162. Similar information may be stored for other sink devices connected to network 110.

Prior measurements of available bandwidth may be stored in cache 188 in any suitable form. For example, the stored measurements may be reflected as a numeric value representing available bandwidth in megabytes per second. Alternatively, a representation of prior measurements may be stored in cache 188 by storing the transmission characteristics previously selected based on that measured bandwidth.

Once transmission parameters for a data stream are selected, other software within media platform layer 180B applies the transmission characteristics to the data stream as it is transmitted. Here, traffic shaping and tagging module 190 performs that function.

Traffic shaping and tagging is a function that has been used in conventional networked systems. Accordingly, traffic shaping and tagging module 190 may be implemented using conventional approaches. For example, for transmissions over a network that supports tagging of packets, traffic shaping and tagging module 190 may apply a tag to each outgoing packet in a data stream.

Alternatively or additionally, traffic shaping and tagging module 190 may interact with application layer 192B. Media platform layer 180B may interact with application layer 192B through an interface that allows probe module 184B to specify available bandwidth information for an application. Many multi-media applications are designed to alter the bandwidth consumed by an A/V stream. For example, an application may reduce the bandwidth required for an A/V data stream carrying a video signal by reducing the resolution of a video signal. An application may reduce the resolution of an A/V signal in multiple ways. For example, the spatial resolution of a video signal may be reduced. Alternatively, chromatic resolution may be reduced by reducing the number of bits used to represent the color of each pixel. Alternatively, temporal resolution may be reduced by decreasing the frame rate of the video signal.

Figure 2:
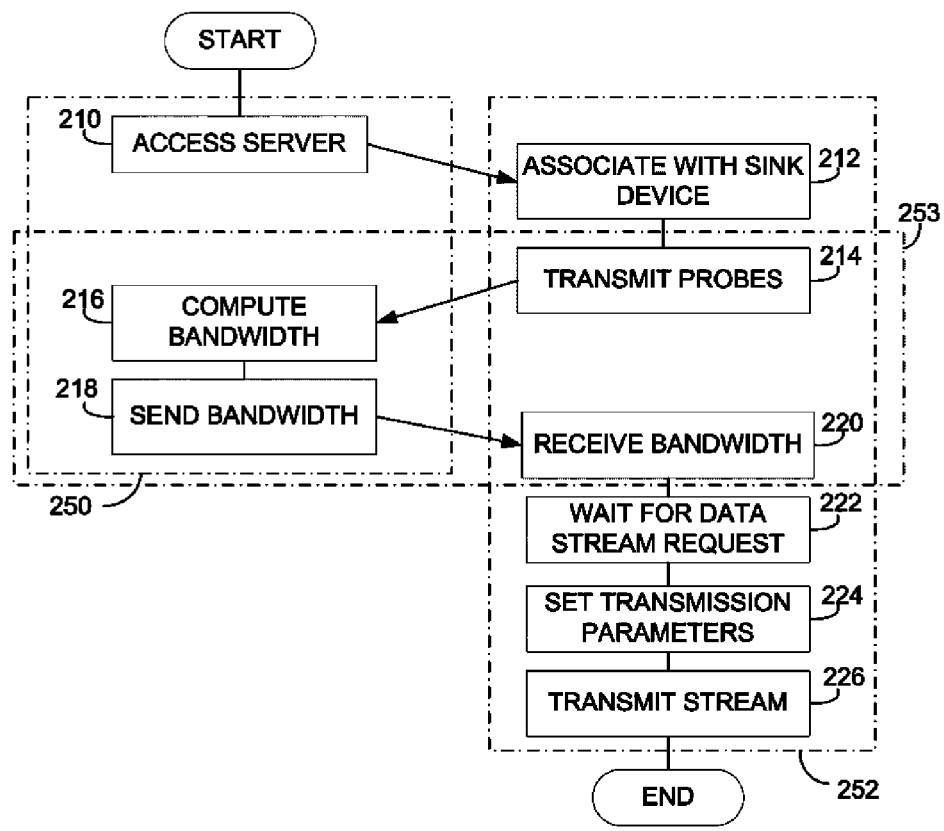
FIG. 2 is a flow chart of an access control process according to an embodiment.

Turning to FIG. 2, an admission control process according to an embodiment is illustrated. The process shown in FIG. 2 is illustrated with a sub-process 250 and a sub-process 252. In this example, sub-process 250 represents processing performed on a sink device and sub-process 252 represents processing performed on a media server, such as media server 134.

The process of FIG. 2 begins at block 210 where the sink device accesses the server. The specific processing performed at block 210 may depend on the nature of the sink device as well as the communication protocol used for communication between the sink device and the media server. For example, in a network in which multi-media applications communicate according to the transmission control protocol (TCP), a sink device may access a media server by requesting a TCP connection from an application on the sink device to an application on the server. However, the process of FIG. 2 may begin when other types of access occur. For example, block 210 may represent an exchange of security information or transmission of an authentication message, device configuration information, a source discovery message or other information used to establish communication between a media server to a sink device. Alternatively, processing at block 210 may involve a request for any type of information that may precede streaming of A/V data from a server to a sink device. For example, block 210 may involve a request for a programming guide or other menu information to be sent to a sink device from a media server.

Regardless of the specific steps involved in accessing the media server at block 210, processing continues at block 212 within sub-process 252. At block 212, the media server associates with the sink device that transmitted the request for access at block 210. Specific steps taken within the server to associate with a sink device may be as in a conventional multi-media application, but generally involve exchanging information between the media server and the sink device that is used by the server to subsequently send an A/V data stream. However, in contrast to prior art approaches, once the association is established at block 212, the admission control process is initiated even though the sink device has not requested an A/V data stream.

Accordingly, the process proceeds to step 214 where sub-process 253 to measure available bandwidth begins. Frequently, available bandwidth refers to the maximum bandwidth that a network can support minus bandwidth in use by devices connected to the network. However, any suitable definition of bandwidth may be used and specific processing steps may depend on the precise definition of available bandwidth. At block 214, the server transmits probes. At block 216, the sink device receives the probes transmitted by probes and computes available bandwidth. At block 218, this available bandwidth is communicated to the media server.

The probing process illustrated in blocks 214, 216 and 218 may be performed in any suitable way. A specific implementation of a probing process is illustrated in more detail in conjunction with FIG. 4 below.

Regardless of the specific method by which available bandwidth is measured, when the media server receives the results of the bandwidth measurement, processing continues at block 220 within sub-process 252.

When processing reaches block 220, media server has available bandwidth information with which it can set transmission parameters for a data stream in accordance with a QoS policy. Accordingly, sub-process 252 proceeds to block 222 where the server waits until a data stream is requested for transmission. When a data stream is available for transmission, processing proceeds to block 224 where the transmission parameters are set. As described above, setting transmission parameters for data streams in accordance with a QoS policy may be performed using conventional processing approaches. For example, if the A/V stream to be transmitted would consume more bandwidth than is available, the parameters set at block 224 may specify transmission of the data stream with a low priority to reduce the bandwidth used by the data stream. Alternatively, if transmission of the data stream would consume less than the available bandwidth, the transmission parameters set at block 224 may allow the data stream to be transmitted with a high priority. Regardless of the specific transmission parameters set, processing proceeds to block 226 where transmission of the data stream begins.

The process of FIG. 2 begins the measurement of available bandwidth prior to the time that a data stream needs to be transmitted. In the embodiment shown, the bandwidth measurement is triggered by a sink device accessing the media server. Consequently, when the data stream is ready for transmission, information necessary to set the transmission parameters for the data stream is already available. However, the situation in FIG. 2 may not occur in all circumstances.

Accordingly, admission control module 186 may be constructed to set transmission parameters for a data stream using other information when the measurement of available bandwidth is not completed when a data stream is requested. In this way, a user will not experience a long delay between an action that triggers a request for a data stream and observing the data stream presented by the sink device.

Figure 3:
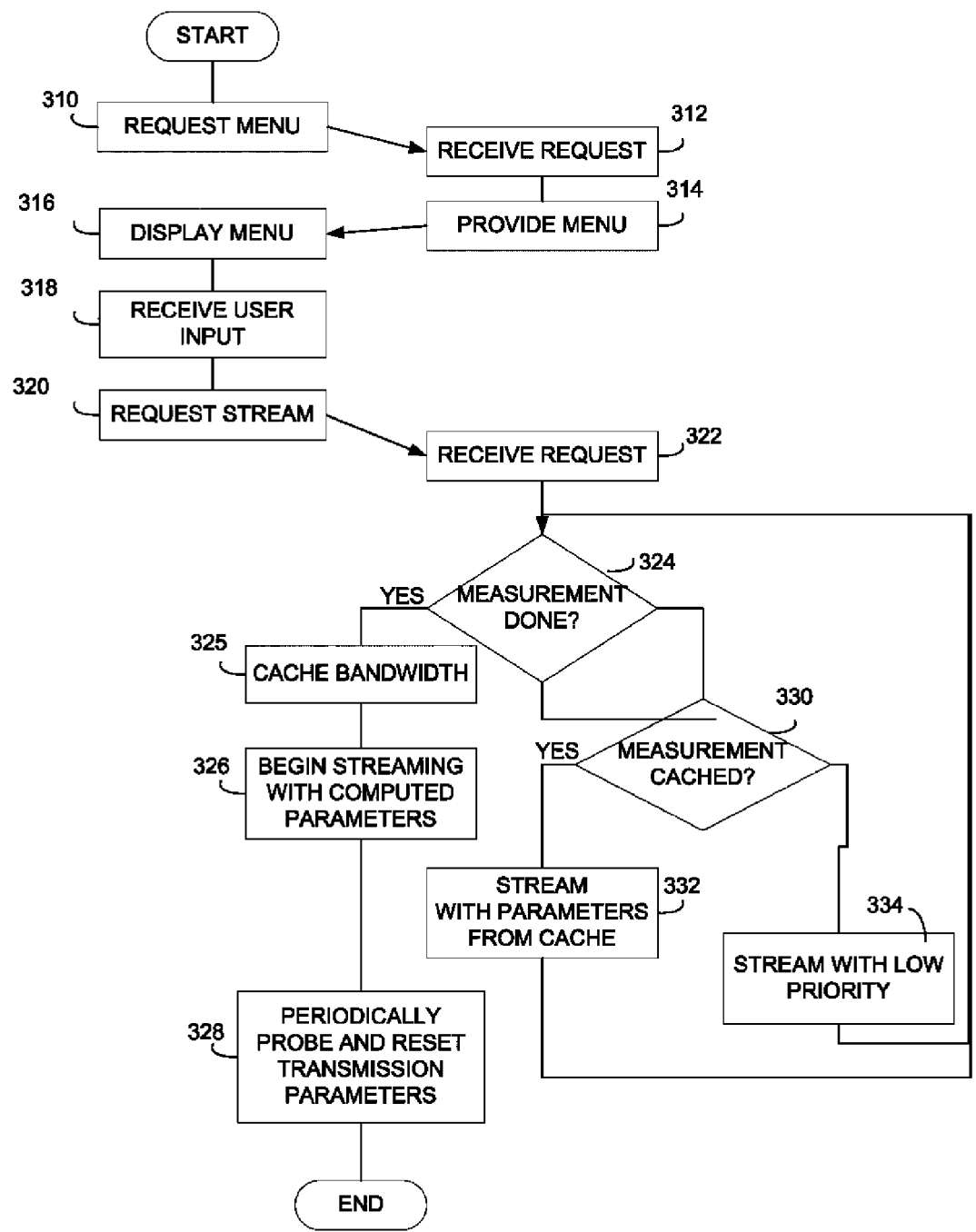
FIG. 3 is a flow chart of a process of transmitting a data stream according to an embodiment.

FIG. 3 shows processing that may occur in an embodiment in which admission control module 186 initiates transmission of a data stream even if the available bandwidth measurement has not been completed. Though transmission of a data stream may begin before available bandwidth is measured, the transmission parameters of the data stream are set so that the data stream does not interfere with other data streams.

The process of FIG. 3 begins at block 310 where a sink device requests menu information from a media server. Prior to the processing at block 310, the sink device may have already accessed the media server, which may have initiated measurement of available bandwidth for communication between the media server and the sink device. Regardless of whether the sink device has accessed the media server prior to processing at block 310, such access will have occurred by the time processing at block 310 is completed. Accordingly, available bandwidth measurement is occurring concurrently with some or all of the process steps shown in FIG. 3.

Concurrent processes are commonly performed in conventional computer systems. The media server executing the process of FIG. 3 may be a multi-tasking computer such that the processing performed in FIG. 3 may be performed in one thread while available bandwidth measurement is being performed in a separate thread. However, any suitable mechanism may be used within a media server to both measure available bandwidth and perform the processing in FIG. 3.

As shown in FIG. 3, the request for menu information transmitted by sink device at block 310 is received by the media server at block 312. The request is passed to application layer 192B where menu information is generated. Menu information is provided at block 314 and transmitted to the sink device.

Within the sink device, the menu information is used to display a menu for a user. At block 318, user input is received that specifies that A/V information is to be streamed to the sink device. Accordingly, at block 320, the sink device transmits a request for the stream of A/V data identified by the user input.

At block 322, the request for the A/V stream is received at the media server. Thereafter, processing branches based on whether available bandwidth measurements have been completed.

If available bandwidth measurements have been completed, the process branches from decision block 324 to block 325. At block 325, a representation of the measured bandwidth is stored. The representation may be stored in any desired form, including as raw measurement data or as information computed from the measurement.

The process then continues to decision block 326. At block 326, the media server streams the A/V data using transmission parameters computed with the measured available bandwidth. The data may be streamed until all required data has been transmitted, at which point the process completes.

Optionally, the process of FIG. 3 may include a process block 328. At block 328, probing of available bandwidth may be periodically performed. If the available bandwidth changes such that the transmission parameters for the data stream are no longer consistent with a QoS policy used on the network, the transmission parameters may be reset at block 328 and the new measured bandwidth may be cached.

If preliminary user interactions with the multi-media system take longer than is required to measure available bandwidth, by the time the process reaches block 320 where a data stream is requested, the available bandwidth measurements will be available for setting transmission parameters. Accordingly, in many scenarios, by the time processing reaches decision block 324, the measurements will be completed.

However, if a request for a data stream is received at block 322 before the available bandwidth is measured, processing according to the embodiment of FIG. 3 nonetheless results in transmission parameters being set for the data stream so that transmission of the data stream may begin without significant delay. When the measurement of available bandwidth has not completed, the process branches from decision block 324 to decision block 330. At decision block 330, a check is made as to whether a prior measurement of available bandwidth has been previously cached for the network link between the media server and sink device. If measurements are cached, processing proceeds to block 332. At block 332, the requested A/V data is streamed using the cached measurements to compute transmission parameters.

Conversely, if it is determined at decision 330 that no measurements have been cached for the network link between the media server and the sink device, processing branches to block 334. At block 334, the requested data is streamed using transmission parameters that indicate packets of the stream should be handled with a low or "best efforts" priority. Using parameters indicating a low priority allows transmission of the data stream to begin, but ensures that transmission of the data stream will not interfere with other data streams already being transmitted. If sufficient network bandwidth is available, transmission, even with a low priority, may result in a usable data stream reaching the sink device. However, if the network does not have sufficient available bandwidth for another data stream, transmitting the new stream with a low priority will not interfere with existing data streams.

If the transmission parameters are set at block 332 based on cache measurements or are set to a low priority at block 334, the parameters may not be the best parameters for use in transmission of the data stream. For example, the network capacity may have changed since an available bandwidth measurement was cached. Alternatively, more or less traffic may be on the network than when the cached parameters were obtained. Accordingly, processing loops back from block 332 and block 334 to decision block 324. As described above, decision block 324 determines whether the available bandwidth measurement is completed. If the measurement is completed when the process loops back to decision block 324, processing will then branch to blocks 325 and 326 where the measured bandwidth is used as described above.

Conversely, if the available bandwidth measurement is not complete, processing will pass again to either block 332 or 334. Processing may continue to loop back to decision block 324 until a measurement is completed or may simply wait at decision block 324 until the measurement is completed.

The above described processing uses a measurement of available bandwidth to set transmission parameters for a data stream. While any suitable method for measuring available bandwidth may be used, a desirable approach is that referred to as the "probe gap" approach for measuring available bandwidth. The probe gap approach measures available bandwidth by transmitting multiple "probes." Each probe may be a packet of relatively small size, such as a packet with a 20 byte payload. By examining the one way delay associated with each probe, the percentage of the packets that is not delayed by other network traffic may be identified. This percentage is used as an indication of the amount of idle time on the network link. By multiplying the percentage of idle time on a network link by the total capacity of that link, the available bandwidth is computed.

FIG. 4 is a flow chart of a process of measuring bandwidth using a probe gap approach. In the software architecture of FIG. 1B, this process may be implemented by probe module 184B and probe agent 184A, with blocks 414, 416, 418, 420, 422, 424 and 426 performed within probe agent 184A. Blocks 410, 412 and 428 may be performed within probe module 184B. However, the process of FIG. 4 may be used in connection with any suitable software architecture.

The process of FIG. 4 begins at block 410 where probing packets are formed. Each probing packet includes a relatively small payload so that the probing packets have only a very small impact on the available network bandwidth that is being measured. Each packet includes a time stamp identifying the time at which the packet is transmitted. At block 410, multiple probing packets are generated so that the data collected using the probing packets is representative of average operating conditions on the network. For example, 200 probing packets may be sent over a five-second interval. The packets may be Poisson-spaced. In some embodiments, each probe may be a small bunch of packets, such as two or three packets.

Regardless of the specific format of the probing packets, the process proceeds to block 412 where the packets are sent.

The process then proceeds to block 414. At block 414, the transmitted probes are received. As part of the processing at block 414, the received time of each probe is recorded.

As processing proceeds to block 416, the one-way delay associated with each packet may be computed. The one-way delay may be computed by subtracting the received time recorded at block 414 for the packet from the time stamp stored in the packet at block 410. In embodiments in which each probe is a group of multiple packets, the longest delay associated with any packet in the group is used as the computed one-way delay at block 416.

At block 418, the one-way delays computed for the probing packets at block 416 are normalized. In the process of FIG. 4, available bandwidth is computed based on a determination of relative differences in the delays of packets. Accordingly, any process that preserves the same relative delays may normalize the computed delay values. For example, the one-way delays may be normalized by subtracting the smallest measured delay from all measured values.

At block 420, the cumulative distribution function of the measured one-way delays is formed. The cumulative distribution function maps a delay time to a percentage of all packets having a delay less than or equal to that value.

The probe gap approach is premised on the theory that the cumulative distribution function has a "knee" or inflection point at the percentage of packets received corresponding to the percentage of time the path is idle. Accordingly, by identifying the percentage of packets associated with the knee in the cumulative distribution function, a utilization percentage for the network link may be computed.

At block 424, the percentage of the network link that is unutilized is computed. The unutilized percentage may be simply computed as the inverse of the utilized percentage identified at block 420.

At block 424, the unutilized percentage is multiplied by the link capacity to compute available bandwidth. At block 426, the computed available bandwidth is communicated to the server.

At block 428, software on the server has, as a result of performing the process of FIG. 4, obtained a measured available bandwidth for a network link.

Having thus described several aspects of at least one embodiment, it is to be appreciated that various alterations, modifications, and improvements will readily occur to those skilled in the art.

For example, it is described above that available bandwidth is measured when a sink device associates with a server and that the measured bandwidth is used to set the bandwidth consumed in sending a stream to that device. More generally, the measured available bandwidth may be used to allocate bandwidth among any or all of the data streams being sourced by a single server or generally being transmitted across the network.

Also, it is described that each sink device is incorporated in a physically separate hardware element. It is possible that a single hardware device could receive and present to a user multiple data streams. In such an embodiment, the same hardware element could contain multiple sink devices.

Further, providing QoS support in a network is described to provide a lower latency alternative to buffering data packets at the sink device. However, the approaches are not mutually exclusive and buffering may be used in conjunction with a network including QoS support.

Also, an alternative way to set transmission parameters is described to be used if cached data measured for the same network link over which a data stream is to be transmitted. The cached information need not be derived from measurements on the same link. Cached measurements could be made on another network link that has characteristics similar to the link over which the data stream will be transmitted.

As another example, the available bandwidth measurement process of FIG. 4 is desirable because it results in an accurate estimation of available network bandwidth without sending large amounts of probing data and may be used to measure available bandwidth as A/V data streams are being communicated. Thus, while the operation of admission control module 186 is described in conjunction with a sink device requesting transmission of a new data stream, the process may be repeated at any time that available bandwidth changes. Changes in network bandwidth may result from new data streams being transmitted over the network, which will consume available bandwidth. Alternatively, changes in available network bandwidth may result from changes in the capacity of network 110. Wireless links, such as wireless links 146 and 150, are susceptible to changes in capacity based on environmental factors, such as radio frequency noise or proximity of a sink device to wireless access point 136. Admission control module 186 may be programmed to repeat the admission control process in response to any such change.

Further, FIG. 4 shows processing for bandwidth measurement at blocks 418, 420, 422 and 424 performed on a sink device, with the result then communicated to the server at block 426. The computation could be performed in any suitable device. For example, one way delays could be communicated to the server, which could then perform the processing in blocks 418, 420, 422 and 424. Such an embodiment may be desirable if a sink device has limited available CPU power.

Such alterations, modifications, and improvements are intended to be part of this disclosure, and are intended to be within the spirit and scope of the claims. Accordingly, the foregoing description and drawings are by way of example only.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the technology may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects of various embodiments as discussed above.

The terms "program" or "software" are used herein in a generic sense to refer to any type of computer code or set of computer-executable instructions that can be employed to program a computer or other processor to implement various aspects of various embodiments as discussed above. Additionally, it should be appreciated that according to one aspect of this embodiment, one or more computer programs that when executed perform methods disclosed herein need not reside on a single computer or processor, but may be distributed in a modular fashion amongst a number of different computers or processors to implement various aspects of various embodiments.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of various embodiments may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A physical computer storage medium storing computer-readable code which when executed by a processor causes a first device adapted to provide streams of data over a network to:

associate with a second device adapted to receive a data stream;

in response to associating with the second device and during a period of time prior to receipt of a request to transfer a stream of data to the second device, initiate advance measurement of an available bandwidth between the first device and the second device by transmitting probes adapted to measure the available bandwidth; and in response to receipt of a request to transfer a stream of data to the second device:

determine whether the advance bandwidth measurement is completed by the time the request to transfer the data stream to the second device is received; and transmit the stream of data using parameters set based at least in part on the determining, wherein, when it is determined that the advance bandwidth measurement is completed, the parameters are set in a first way, at least in part based on the advance bandwidth measurement of the available bandwidth made using the transmitted probes; and when it is determined that the advance bandwidth measurement is not completed, the parameters are set in a second way, different than the first way, and the parameters are recomputed upon completion of the advance bandwidth measurement.

2. The physical computer storage medium of claim 1, wherein associating with a second device comprises receiving a source discovery message from the second device.

3. The physical computer storage medium of claim 1, wherein associating with a second device comprises receiving an authentication message from the second device.

4. The physical computer storage medium of claim 1, wherein the computer-readable code, when executed by a processor, additionally causes the first device to transmit menu information to the second device, the menu information comprising a plurality of user-selectable menu entries and wherein receiving a request to transfer the stream of data comprises receiving an indication that a user has selected a menu entry of the plurality of user-selectable menu entries.

5. The physical computer storage medium of claim 4, wherein probes are transmitted between the transmitting of menu information and the receiving a request to transfer the stream of data.

6. The physical computer storage medium of claim 4, additionally comprising transmitting menu information to the second device concurrently with transmitting the probes.

7. The physical computer storage medium of claim 6, wherein transmitting the stream of data comprises transmitting a stream of audio/visual data.

* * * * *